US012672109B2

(12) United States Patent (10) Patent No.: US 12,672,109 B2
Liu et al. (45) Date of Patent: Jun. 30, 2026

(54) INFORMATION TRANSMISSION METHOD AND APPARATUS, AND ELECTRONIC DEVICE

(71) Applicant: VIVO MOBILE COMMUNICATION CO., LTD., Guangdong (CN)

(72) Inventors: Shixiao Liu, Guangdong (CN); Zichao Ji, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 433 days.

(21) Appl. No.: 17/983,182

(22) Filed: Nov. 8, 2022

(65) Prior Publication Data

US 2023/0066942 A1 Mar. 2, 2023

Related U.S. Application Data

(63) Continuation of application No. PCT/CN2021/093293, filed on May 12, 2021.

(30) Foreign Application Priority Data

May 12, 2020 (CN) .......................... 202010399529.0

(51) Int. Cl.
  *H04W 4/00* (2018.01)
  *H04W 72/02* (2009.01)
  (Continued)
(52) U.S. Cl.
  CPC ....... *H04W 72/02* (2013.01); *H04W 72/0446* (2013.01); *H04W 72/0453* (2013.01); *H04W 72/20* (2023.01); *H04W 72/56* (2023.01)

(58) Field of Classification Search
  CPC ............. H04W 72/02; H04W 72/0446; H04W 72/0453; H04W 72/20; H04W 72/56;
  (Continued)

(56) References Cited

U.S. PATENT DOCUMENTS

2019/0052436 A1 2/2019 Desai et al.
2019/0082459 A1 3/2019 Faurie et al.
(Continued)

FOREIGN PATENT DOCUMENTS

CN 109803400 A 5/2019
CN 110972102 A 4/2020
(Continued)

OTHER PUBLICATIONS

International Search Report and Written Opinion for Application No. PCT/CN2021/093293, dated Jul. 26, 2021, 9 Pages.
(Continued)

*Primary Examiner* — Chuong T Ho
(74) *Attorney, Agent, or Firm* — BROOKS KUSHMAN P.C.

(57) ABSTRACT

An information transmission method and apparatus, and an electronic device are provided. The information transmission method includes: sending first information to at least one second device, where the first information is used to trigger the second device to transmit assistance information or used for performing resource selection or reservation by the second device.

13 Claims, 5 Drawing Sheets

(51) Int. Cl.

| | |
|---|---|
| *H04W 72/0446* | (2023.01) |
| *H04W 72/0453* | (2023.01) |
| *H04W 72/20* | (2023.01) |
| *H04W 72/56* | (2023.01) |

(58) Field of Classification Search
CPC ..... H04W 72/25; H04W 72/40; H04W 92/18; H04W 28/26; H04W 4/40; H04L 5/0005; H04L 5/0016; H04L 5/0023; H04L 5/0051; H04L 5/0053; H04L 5/0055; H04L 5/0057; H04L 5/0094
USPC .................................................. 370/329, 330
See application file for complete search history.

(56) References Cited

U.S. PATENT DOCUMENTS

| | | | | |
|---|---|---|---|---|
| 2020/0068609 | A1 | 2/2020 | Wang et al. | |
| 2020/0178256 | A1 | 6/2020 | Tang | |
| 2020/0383088 | A1 | 12/2020 | Min et al. | |
| 2021/0028914 | A1* | 1/2021 | Jin | H04W 8/22 |
| 2021/0212023 | A1 | 7/2021 | Zeng et al. | |
| 2021/0212026 | A1 | 7/2021 | Peng et al. | |
| 2022/0124697 | A1* | 4/2022 | Yao | H04W 72/20 |
| 2022/0330267 | A1* | 10/2022 | Hui | H04B 17/327 |
| 2023/0038246 | A1* | 2/2023 | Dong | H04W 4/40 |
| 2023/0049307 | A1* | 2/2023 | Liu | H04W 72/51 |
| 2023/0164825 | A1* | 5/2023 | Deng | H04W 72/02 |
| | | | | 370/329 |
| 2023/0171738 | A1* | 6/2023 | Di Girolamo | H04W 72/20 |
| | | | | 370/329 |
| 2023/0189121 | A1* | 6/2023 | Hedman | H04W 4/021 |
| | | | | 370/329 |
| 2023/0209412 | A1 | 6/2023 | Liu et al. | |

FOREIGN PATENT DOCUMENTS

| | | |
|---|---|---|
| CN | 111034297 A | 4/2020 |
| EP | 4132141 A1 | 2/2023 |
| JP | 2020529801 A | 10/2020 |
| JP | 2023525146 A | 6/2023 |
| WO | 2018201784 A1 | 11/2018 |
| WO | 2019028759 A1 | 2/2019 |
| WO | 2019228321 A1 | 12/2019 |
| WO | 2020025147 A1 | 2/2020 |
| WO | 2021207459 A1 | 10/2021 |
| WO | 2021207473 A1 | 10/2021 |

OTHER PUBLICATIONS

Interdigital, Inc. NR Sidelink Mode 2 Resource Allocation, 3GPP TSG RAN WG1 #98bis R1-1911278, Chongqing, China, Oct. 2019, 10 Pages.

Extended European Search Report for Application No. 21804914.6, dated Sep. 6, 2023, 10 Pages.

Spreadtrum Communications "Discussion on resource allocation for mode 2" 3GPP TSG RAN WG1 Meeting #95, Spokane, USA, Nov. 2018, R1-1813085, 7 Pages.

First Office Action for Japanese Application No. 2022-567409, dated Nov. 8, 2023, 6 Pages.

Fraunhofer HHI, Fraunhofer IIS "Designs for NR V2X Mode 2 Resource Allocation" 3GPP TSG RAN WG1 Meeting #95, Spokane, USA, Nov. 2018, R1-1812399, 10 Pages.

CMCC "Discussion on resource allocation mechanism for NR V2X" 3GPP TSG RAN WG1 Meeting #95, Spokane, USA, Nov. 2018, R1-1812880, 4 Pages.

Intel Corporation "Feature Lead Summary for NR-V2X AI—7.2. 4.1.4 Resource Allocation.Mechanism" 3GPP TSG RAN WG1 Meeting #96, Athens, Greece, Feb. 2019, R1-1903623, 18 Pages.

First Office Action for Korean Application No. 10-2022-7041212, dated Feb. 21, 2025, 11 Pages.

CMCC "Discussion on resource allocation mechanism for NR V2X" 3GPP TSG RAN WG1 Ad-Hoc Meeting 1901, Taipei, Jan. 2019, R1-1900406, 4 Pages.

Second European Office Action for European Patent Application No. 21804914.6 mailed Oct. 2, 2025. 12 pages.

* cited by examiner

INFORMATION TRANSMISSION METHOD AND APPARATUS, AND ELECTRONIC DEVICE

CROSS-REFERENCE TO RELATED APPLICATIONS

This application is a continuation of International Application No. PCT/CN2021/093293 filed on May 12, 2021, which claims priority to Chinese Patent Application No. 202010399529.0, filed on May 12, 2020, which are incorporated herein by reference in their entireties.

TECHNICAL FIELD

This application pertains to the field of communications technologies, and specifically, relates to an information transmission method and apparatus, and an electronic device.

BACKGROUND

A long term evolution (LTE) system supports sidelink (sidelink, side link, SL, or the like) transmission, that is, one terminal (User Equipment, UE) directly performs data transmission on a physical layer with another terminal. On an LTE sidelink, communication is performed based on broadcast. Although the LTE sidelink can be used to support basic secure vehicle to everything (V2X) communication, the LTE sidelink is not applicable to other more advanced V2X services. A 5G NR (New Radio) system supports a more advanced sidelink transmission design, such as unicast, multicast, or groupcast, and therefore can support more comprehensive service types.

The NR V2X defines two resource allocation modes. One mode is a mode 1 in which a base station schedules resources. The other mode is a mode 2 in which a terminal itself determines resources to be used for transmission. In this case, resource information may come from a broadcast message of the base station or preconfigured information. If the terminal works within a communication range and has a radio resource control (RRC) connection to the base station, the terminal may be in the mode 1 and/or the mode 2. If the terminal works within the communication range but has no RRC connection to the base station, the terminal can only work in the mode 2. If the terminal is beyond the communication range, the terminal can only work in the mode 2 and perform V2X transmission based on the preconfigured information.

For the mode 2, a specific working mode is as follows: (1) After resource selection is triggered, a transmitting terminal first determines a resource selection window, where a lower boundary of the resource selection window is at a time T1 after the resource selection is triggered, an upper boundary of the resource selection is at a time T2 after the trigger, T2 is a value selected by the terminal implementation in a packet delay budget (PDB) of a transport block (TB) of the terminal, and T2 is not earlier than T1. (2) Before the resource selection, the terminal needs to determine a candidate resource set for the resource selection by comparing reference signal received power (RSRP) measured on a resource in the resource selection window with a corresponding RSRP threshold. If the RSRP is lower than the RSRP threshold, the resource can be included in the candidate resource set. (3) After the resource set is determined, the terminal randomly selects a transmission resource from the candidate resource set. In addition, the terminal may reserve transmission resources in current transmission for subsequent transmission.

Moreover, the NR V2X supports a chain resource reservation mode. In other words, a current resource may be reserved by using one piece of sidelink control information (SCI) and a maximum of two resources may be reserved additionally. In a next resource, another two reserved resources may be indicated. In the selection window, the resources may be reserved continuously in a dynamic reservation mode.

Limited by the existing resource allocation mode, reliability and energy consumption rate of the sidelink are relatively low, and some scenarios with low transmission reliability occur. For example, limited by half duplex, some terminals cannot monitor reservation information of other terminals, resulting in low reliability; and due to hidden nodes, two terminals in close proximity reserve a same resource, resulting in a resource collision and low reliability.

SUMMARY

An objective of embodiments of this application is to provide an information transmission method and apparatus, and an electronic device.

According to a first aspect, an embodiment of this application provides an information transmission method, where the method is applied to a first device and includes:

sending first information to at least one second device, where the first information is used to trigger the second device to transmit assistance information or used for performing resource selection or reservation by the second device.

According to a second aspect, an embodiment of this application provides an information transmission method, where the method is applied to a second device and includes:

receiving first information sent by a first device, where the first information is used to trigger the second device to transmit assistance information or used for performing resource selection or reservation by the second device.

According to a third aspect, an embodiment of this application provides an information transmission apparatus, where the apparatus is applied to a first device and includes:

a first sending module, configured to send first information to at least one second device, where the first information is used to trigger the second device to transmit assistance information or used for performing resource selection or reservation by the second device.

According to a fourth aspect, an embodiment of this application provides an information transmission apparatus, where the apparatus is applied to a second device and includes:

a first receiving module, configured to receive first information sent by a first device, where the first information is used to trigger the second device to transmit assistance information or used for performing resource selection or reservation by the second device.

According to a fifth aspect, an embodiment of this application provides an electronic device, where the electronic device includes a processor, a memory, and a program or instructions stored in the memory and capable of running on the processor, and when the program or instructions are executed by the processor, the steps of the method according to the first aspect or the second aspect are implemented.

According to a sixth aspect, an embodiment of this application provides a readable storage medium, where the readable storage medium stores a program or instructions, and when the program or instructions are executed by a processor, the steps of the method according to the first aspect or the second aspect are implemented.

According to a seventh aspect, an embodiment of this application provides a chip, where the chip includes a processor and a communications interface, the communications interface is coupled to the processor, and the processor is configured to run a program or instructions to implement the method according to the first aspect or the second aspect.

In the embodiments of this application, the first device sends the first information to the at least one second device, where the first information instructs the second device to transmit the assistance information or instructs the second device to perform resource selection or reservation for data transmission. In this way, transmission reliability can be improved, and demodulation complexity can be reduced.

DETAILED DESCRIPTION

The following clearly and completely describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, the term "and/or" in the specification and claims indicates at least one of connected objects, and the character "/" generally represents an "or" relationship between associated objects.

The following describes the embodiments of this application with reference to the accompanying drawings. An information transmission method and apparatus, and an electronic device provided in the embodiments of this application may be applied to a wireless communications system. The wireless communications system may be a 5G system, a long term evolution (LTE) system, an evolved long term evolution (eLTE) system, or a later evolved communications system. In the embodiments of this application, LTE and NR systems are used as examples, but the embodiments of this application are not limited to such systems. The technical solutions provided in this application can be applied to other systems that have the same problem.

The information transmission method and apparatus, and electronic device provided in the embodiments of this application are hereinafter described in detail by using specific embodiments and application scenarios thereof with reference to the accompanying drawings.

Figure 1:
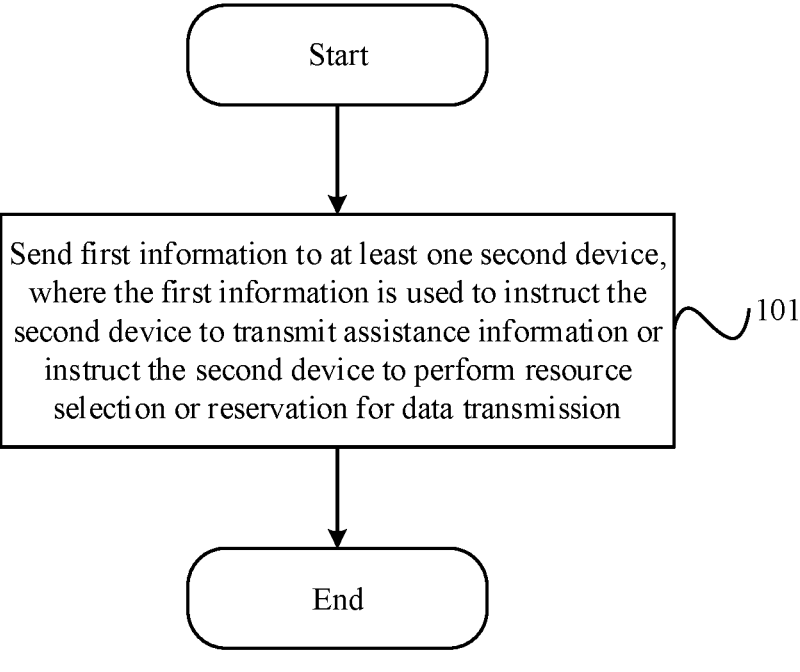
FIG. 1 is a first schematic diagram of steps of an information transmission method according to an embodiment of this application.

As shown in FIG. 1, an embodiment of this application provides an information transmission method. The method is applied to a first device and includes:

sending first information to at least one second device, where the first information is used to trigger the second device to transmit assistance information or used for performing resource selection or reservation by the second device.

Figure 2:
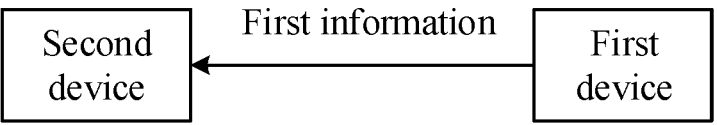
FIG. 2 is a schematic diagram of a scenario 1 according to an embodiment of this application.

Specific application scenarios of this embodiment of this application include at least one of the following:

Scenario 1: As shown in FIG. 2, in a unicast scenario, a first device sends first information to a second device, and based on a resource indicated by the first information, the second device performs resource selection or resource reservation for data transmission.

Figure 3:
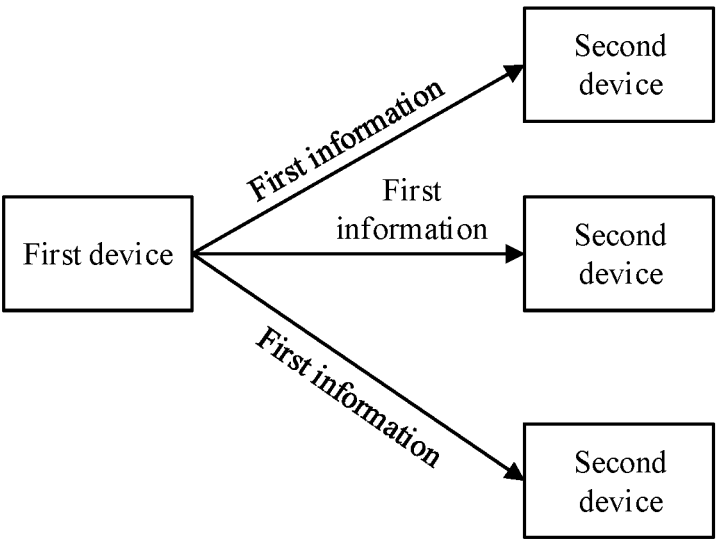
FIG. 3 is a schematic diagram of a scenario 2 according to an embodiment of this application.

Scenario 2: As shown in FIG. 3, in a groupcast scenario, a plurality of first devices in a group send first information to a second device in the group, and based on a resource indicated by the first information, the second device performs resource selection or resource reservation (for data transmission); or the second device transmits assistance information based on a resource indicated by the first information.

Figure 4:
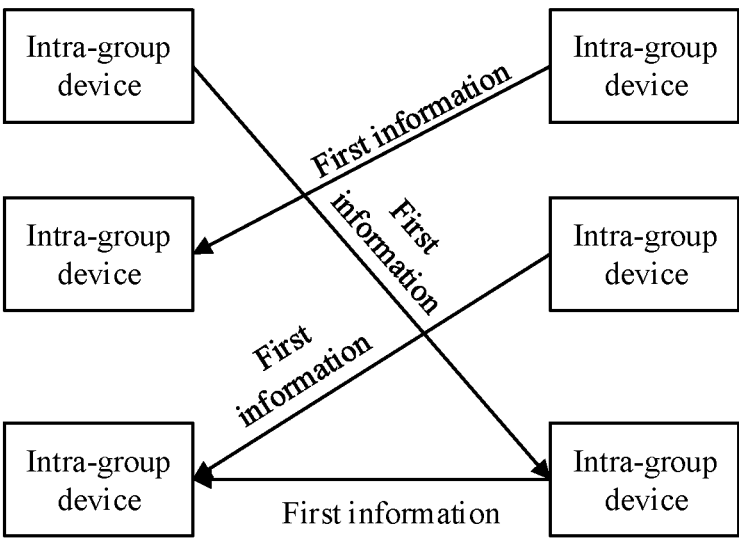
FIG. 4 is a schematic diagram of a scenario 3 according to an embodiment of this application.

Scenario 3: As shown in FIG. 4, in a groupcast scenario, any device in a group sends first information to any other device in the group, and based on a resource indicated by the first information, the device receiving the first information performs resource selection or resource reservation (for data transmission); or the device receiving the first information transmits assistance information based on a resource indicated by the first information.

Figure 5:
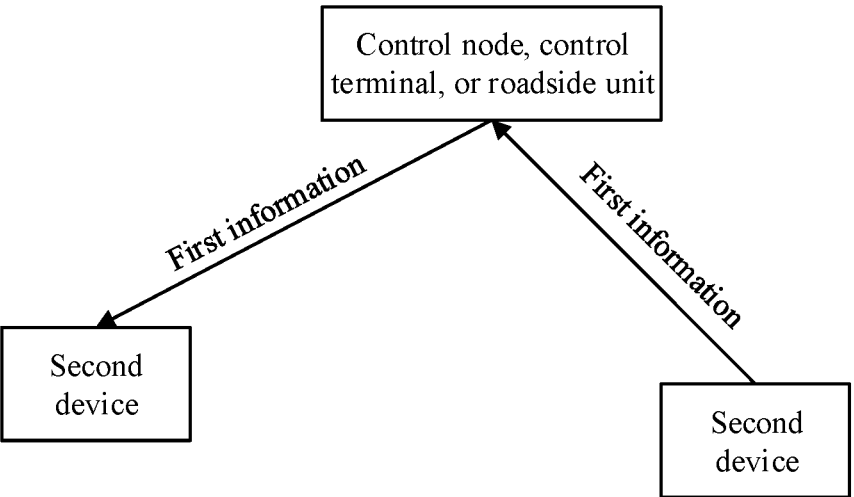
FIG. 5 is a schematic diagram of a scenario 4 according to an embodiment of this application.

Scenario 4: As shown in FIG. 5, in a scenario in which a control node or a control terminal or a roadside unit exists, the control node or the control terminal or the roadside unit sends first information to a second device, and based on a resource indicated by the first information, the device receiving the first information performs resource selection or resource reservation (for data transmission); or the device receiving the first information transmits assistance information based on a resource indicated by the first information.

Scenario 5: In a broadcast scenario, a first device (any terminal) may send first information to a second device (any other terminal), and based on a resource indicated by the first information, the device receiving the first information performs resource selection or resource reservation (for data transmission); or the device receiving the first information transmits assistance information based on a resource indicated by the first information.

In an optional embodiment, the first device may determine the first information based on at least one of an indication from a control node, an indication from a control terminal, an indication from a roadside unit RSU, an indication from a relay node, a network configuration, and an indication from a specific terminal.

In an optional embodiment, the first information includes at least one of the following information:

first information type indication information, used to indicate whether the first information is trigger information for triggering transmission of the assistance information;

time domain resource indication information;

frequency domain resource indication information;

time information for transmitting the assistance information, where the time information may indicate a time window, and the second device may send the assistance information in the time window;

identification information of a first information sender, used to distinguish the first information sender;

identification information of a first information receiver, which is used to distinguish the first information receiver and may be a group ID, a terminal ID, a member ID in a group, or a specific fixed ID; and information about a to-be-transmitted service of the first device.

Optionally, if the first information includes the identification information of the first information receiver, if the identification information of the first information receiver is a predefined ID or an ID configured by a higher layer, all terminals need to receive the first information; if the identification information of the first information receiver is a group ID, all members in a specific group need to receive the first information; if the identification information of the first information receiver is a user ID in a group, a specific member in a specific group needs to receive the first information; or if the identification information of the first information receiver is a terminal ID, a specific user needs to receive the first information.

The first device may determine, based on a quality of service QoS parameter of the to-be-transmitted service, or a higher-layer configuration, or a predefinition, the time information for transmitting the assistance information, and indicate the time information in the first information to the second device.

It should be noted that, if the first information is the trigger information for triggering transmission of the assistance information, the time domain resource indication information and/or the frequency domain resource indication information included in the first information are/is time domain resource indication information and/or frequency domain resource indication information for transmitting the assistance information. If the first information is not the trigger information for triggering transmission of the assistance information, the time domain resource indication information and/or the frequency domain resource indication information included in the first information are/is information about a resource occupied or reserved by the first device.

Optionally, the information about the to-be-transmitted service of the first device includes at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement value corresponding to the to-be-transmitted service.

Optionally, in this embodiment of this application, the first information type indication information is used to indicate at least one of the following:

the first information is not the trigger information for triggering transmission of the assistance information; and the first information is the trigger information for triggering transmission of the assistance information.

Optionally, in this embodiment of this application, the first information is carried in target information, and the target information includes at least one of the following:

sidelink control information SCI;

downlink control information (DCI);

radio resource control RRC information;

direct link radio resource control PC5-RRC information; and sidelink feedback control information (SFCI).

The sidelink control information further includes first-stage sidelink control information (1st stage SCI) and second-stage sidelink control information (2nd stage SCI).

In an optional embodiment, in a case that the first device uses the first-stage sidelink control information and/or the second-stage sidelink control information to carry the first information, in the first-stage sidelink control information and/or the second-stage sidelink control information, the type indication information is indicated by a first indication field, where each code point in the first indication field corresponds to one type of the first information; for example, the type indication information is indicated by a 1-bit first indication field, where a code point 0 represents that the first information is not the trigger information for triggering transmission of the assistance information, and a code point 1 represents that the first information is the trigger information; and the second device determines, based on a decoding result of the first indication field, whether the first information is the trigger information for triggering transmission of the assistance information; or in the first-stage sidelink control information and/or the second-stage sidelink control information, the type indication information is indicated by joint coding with a second indication field, where each code point in the second indication field corresponds to one type of the first information; for example, the second indication field is a priority indication field, where when the priority indication field indicates a specific priority, it represents that the first information is the trigger information for triggering transmission of the assistance information, and other priorities represent that the first information is not the trigger information for triggering transmission of the assistance information; for another example, the second indication field is a demodulation reference signal (DMRS) pattern indication field, where when the DMRS pattern indication field indicates a specific DMRS configuration, it represents that the first information is the trigger information for triggering transmission of the assistance information, and other DMRS configurations represent that the first information is not the trigger information for triggering transmission of the assistance information;

or in the first-stage sidelink control information and/or the second-stage sidelink control information, the type indication information is indicated by a code point in a third indication field, where each code point in the third indication field corresponds to one type of the first information; for example, a specific code point in the third indication field represents that the first information is the trigger information for triggering transmission of the assistance information, and other code points represent that the first information is not the trigger information for triggering transmission of the assistance information;

or in the second-stage sidelink control information, the type indication information is implicitly indicated by a code point in an information destination ID indication field; for example, when n bits before/after a destination ID are a fixed value, the first information received by a corresponding user is the trigger information for triggering transmission of the assistance information; or when n bits before/after a destination ID are a value within an interval, the first information received by a corresponding user is the trigger information for triggering transmission of the assistance information; and a trigger information receiver determines, based on content of the destination indication field in the second-stage SCI, whether the first information is the trigger information for triggering transmission of the assistance information;

or in the second-stage sidelink control information, the type indication information is implicitly indicated by a communication range requirement indication field and a geographical area ID indication field; for example, if a receiving device determines, based on content of the two indication fields, that a distance between the receiving device and a sending device is greater or smaller than a distance value indicated by the communication range indication field, the first information is the trigger information for triggering transmission of the assistance information; and an information receiver determines, based on the content of the two indication fields in the second-stage SCI, whether the first information is the trigger information for triggering transmission of the assistance information.

The second indication field and/or the third indication field include/includes at least one of the following:

a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS port quantity indication field, a modulation and coding scheme indication field, a hybrid automatic repeat request (HARQ) process ID indication field, a new data indicator (NDI) indication field, a redundancy version (RV) indication field, an information source ID indication field, an information destination ID indication field, a channel state information CSI requirement indication field, a communication range requirement indication field, and an area identification ID (zone ID) indication field.

Example 1

The type indication information is indicated by an independent indication field in the first-stage SCI. A length of the indication field may be 1 bit, and two corresponding code points are 0 and 1 respectively. A code point 0 indicates that the information is not the trigger information for triggering transmission of the assistance information, and a code point 1 indicates that the information is the trigger information for triggering transmission of the assistance information.

Similarly, the type indication information is indicated by an independent indication field in the second-stage SCI. A length of the indication field may be 1 bit, and two corresponding code points are 0 and 1 respectively. A code point 0 indicates that the information is not the trigger information for triggering transmission of the assistance information, and a code point 1 indicates that the information is the trigger information for triggering transmission of the assistance information.

Alternatively, the type indication information may be jointly coded with another indication field in the first-stage SCI to indicate whether the first information is the assistance information. For example, the indication is provided by joint coding with the priority indication field in the first-stage SCI. An existing priority indication field includes three bits (bits), corresponding to eight code points. Without increasing the number of bits, assuming that a code point 000 corresponds to a priority 1 and indicates that the first information carried in the first-stage SCI is the trigger information for triggering transmission of the assistance information, the assistance information receiver may determine, based on a decoding result of the priority indication field in the first-stage SCI, whether the first information carried in the first-stage SCI is the trigger information for triggering transmission of the assistance information. If the number of bits is increased, for example, increased to four bits in the priority indication field and corresponding to 16 code points, but it still only supports the indication of eight priorities, each priority indication corresponds to two code points. For example, a priority 8 corresponds to code points 1110 and 1111, where 1110 corresponds to the priority 8 and indicates that the first-stage SCI does not carry the trigger information for triggering transmission of the assistance information, and 1111 corresponds to the priority 8 and indicates that the first information carried in the first-stage SCI is the trigger information for triggering transmission of the assistance information. In addition, the existing indication fields further include the frequency domain resource allocation indication field, the time domain resource allocation indication field, the resource reservation period indication field, the DMRS pattern indication field, the second-stage SCI format indication field, the beta offset (P offset) indication field, the DMRS port quantity indication field, the modulation and coding scheme indication field, and the like.

Alternatively, the type indication information may be jointly coded with another indication field in the second-stage SCI to indicate whether the first information is the assistance information. For example, the indication is provided by joint coding with the RV indication field in the second-stage SCI. An existing priority indication field includes two bits, corresponding to four code points. Without increasing the number of bits, assuming that a code point 00 corresponds to an RV version 0 and indicates that the first information carried in the second-stage SCI is the trigger information for triggering transmission of the assistance information, the information receiver may determine, based on a decoding result of the priority indication field in the second-stage SCI, whether the first information carried in the second-stage SCI is the trigger information for triggering transmission of the assistance information. If the number of bits is increased, for example, increased to three bits in the RV indication field and corresponding to eight code points, but it still only supports the indication of four priorities, each priority indication corresponds to two code points. For example, an RV version 0 corresponds to code points 000 and 001, where 000 corresponds to the RV version 0 and the first information carried in the second-stage SCI is not the trigger information for triggering transmission of the assistance information, and 001 corresponds to the RV version 0 and indicates that the first information carried in the second-stage SCI is the trigger information for triggering transmission of the assistance information. In addition, available indication fields further include the HARQ process ID indication field, the NDI indication field, the communication range indication field, the source ID indication field, the destination ID indication field, the CSI requirement indication field, the zone ID indication field, and the like.

Example 2

In the second-stage SCI, the type indication information is indicated by a code point reserved in an existing indication field, and the first information receiver determines, based on a decoding result of the indication field in the second-stage SCI, whether the first information is the trigger information for triggering transmission of the assistance information. For example, the type indication information is indicated by a code point reserved in the communication range indication field in the second-stage SCI. A length of the communication range indication field is five bits, and there are several reserved code points. For example, a reserved code point 11111 is used to indicate that the first information carried in the second-stage SCI is the trigger information for triggering transmission of the assistance information.

In addition, available indication fields further include the HARQ process ID indication field, the NDI indication field, the RV indication field, the source ID indication field, the destination ID indication field, the channel state information (CSI) requirement indication field, the zone ID indication field, and the like.

In another optional embodiment, in a case that the target information is at least one of the first-stage sidelink control information, the second-stage sidelink control information, and the downlink control information, the method further includes:

indicating, by using a format of the target information, whether the first information is the trigger information for triggering transmission of the assistance information, where for example, a specific format of the SCI or DCI is used to indicate that the first information is the trigger information for triggering transmission of the assistance information, and the second device determines the SCI format or the DCI format based on a length of the SCI or a length of the DCI, to determine whether the first information is the trigger information for triggering transmission of the assistance information.

In a case that the target information is the second-stage sidelink control information, the first information is carried in the second-stage sidelink control information in a specific format, and the method further includes:

indicating the format of the second-stage sidelink control information by using a fourth indication field in the first-stage sidelink control information, where the fourth indication field includes at least one of the following:

a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS configuration type indication field, and a modulation and coding scheme indication field.

For example, a specific code point or a specific bit in the "second-stage SCI format" indication field in the first-stage SCI indicates whether the first information carried in the second-stage SCI is the trigger information for triggering transmission of the assistance information.

For another example, a specific or new second-stage SCI format is used to carry the trigger information for triggering transmission of the assistance information, and a code point or a specific bit in the "second-stage SCI format" indication field in the first-stage SCI indicates whether the second-stage SCI carries the trigger information for triggering transmission of the assistance information.

In another optional embodiment, in a case that the target information is at least one of the first-stage sidelink control information, the second-stage sidelink control information, and the downlink control information, the method further includes:

indicating, by using a radio network temporary identifier (RNTI) for scrambling the target information, whether the first information is trigger information for triggering transmission of the assistance information.

If the first information is the trigger information for triggering transmission of the assistance information, a method for generating the RNTI for scrambling the target information includes at least one of the following:

being generated by using a predefined value;

being equal to a predefined scrambling RNTI;

being equal to a scrambling RNTI configured by a higher layer;

being generated by using a resource pool ID;

being generated by using an information source ID;

being generated by using an information destination ID; and being generated by using a group ID.

In another optional embodiment, the method further includes:

indicating, by using a transmission resource of the first information, whether the first information is the trigger information for triggering transmission of the assistance information.

If the first information is the trigger information for triggering transmission of the assistance information, the transmission resource of the first information includes at least one of the following:

a physical sidelink feedback channel;

a physical sidelink data channel;

a resource in a dedicated resource pool;

a preconfigured transmission resource;

a resource in a specific subband in a resource pool, for example, resources in last n subbands; and a resource on a specific symbol or in a specific subframe in a resource pool, for example, a resource on a last symbol in each slot, or for another example, a resource in a last slot in each period, assuming that every n slots are one period.

In another optional embodiment of this application, in a case that the first device uses the first-stage sidelink control information and/or the second-stage sidelink control information to carry the time domain resource indication information in the first information, in the first-stage sidelink control information and/or the second-stage sidelink control information, the time domain resource indication information is indicated by a fifth indication field, where each code point in the fifth indication field corresponds to at least one piece of time domain resource indication information, and the time domain resource indication information includes at least one of a time domain resource start position, a time domain resource end position, and a time domain resource length, where the fifth indication field is an independent indication field, or the fifth indication field is a jointly coded indication field.

A time domain resource length may be a value (for example, 1 slot), predefined by a protocol or configured by a higher layer, or may be L slots or symbols or frames or subframes. Each code point corresponds to a time domain resource start position and length, and a length of the indication field is N. A time domain resource position within future 2N+L−1 time units starting from a current time can be indicated.

In another optional embodiment of this application, in a case that the first device uses the first-stage sidelink control information and/or the second-stage sidelink control information to carry the frequency domain resource indication information in the first information, in the first-stage sidelink control information and/or the second-stage sidelink control information, the frequency domain resource indication information is indicated by a sixth indication field, where each code point in the sixth indication field corresponds to at least one piece of frequency domain resource indication information, and the frequency domain resource indication information includes at least one of a frequency domain resource start position, a frequency domain resource end position, and a frequency domain resource length, where the sixth indication field is an independent indication field, or the sixth indication field is a jointly coded indication field.

In another optional embodiment of this application, in the first information, the time information for transmitting the assistance information includes at least one of the following:

time window position information for transmitting the assistance information;

time window length information for transmitting the assistance information; and delay information for transmitting the assistance information.

The method further includes:

determining, based on a quality of service QoS parameter mapping of the to-be-transmitted service, or a predefinition, or a higher-layer configuration, the time information for transmitting the assistance information, where the QoS parameter of the to-be-transmitted service includes at least one of the following:

a delay requirement of the to-be-transmitted service;

a priority of the to-be-transmitted service;

a reliability requirement of the to-be-transmitted service;

a transmission rate requirement of the to-be-transmitted service;

a data volume of the to-be-transmitted service; and a communication range requirement of the to-be-transmitted service.

Optionally, in a case that the first device uses the first-stage sidelink control information and/or the second-stage sidelink control information to carry the time information for transmitting the assistance information, in the first information, in the first-stage sidelink control information and/or the second-stage sidelink control information, the time window position information and/or the time window length information are/is indicated by a seventh indication field, where each code point in the seventh indication field corresponds to at least one piece of time window position information and/or time window length information, and the time window position information includes a time window start position and/or a time window end position, where the seventh indication field is an independent indication field, or the seventh indication field is a jointly coded indication field.

Alternatively, in a case that the first device uses the first-stage sidelink control information and/or the second-stage sidelink control information to carry the time window length information for transmitting the assistance information, in the first information, in the first-stage sidelink control information and/or the second-stage sidelink control information, the time window length information is indicated by an eighth indication field, where each code point in the eighth indication field corresponds to one time window length, where the eighth indication field is an independent indication field, or the eighth indication field is a jointly coded indication field.

Alternatively, in a case that the first device uses the first-stage sidelink control information and/or the second-stage sidelink control information to carry the delay information for transmitting the assistance information, in the first information, in the first-stage sidelink control information and/or the second-stage sidelink control information, the delay information for transmitting the assistance information, in the first information is indicated by a ninth indication field, where each code point in the ninth indication field corresponds to one delay value for transmitting the assistance information, where the ninth indication field is an independent indication field, or the ninth indication field is a jointly coded indication field.

For example, time window start position information may be indicated by an independent indication field in the SCI/DCI, or indicated by a code point reserved in an existing indication field; it is used to indicate a start time point in a future time window, and each code point corresponds to a start position of one time window. Alternatively, the time window length information of the time window may be indicated by an independent indication field in the SCI/DCI, or indicated by a code point reserved in an existing indication field; it is used to indicate a time window length, its unit may be slot/ms/symbol/frame/subframe, and each code point corresponds to a length of one time window.

For another example, joint coding is used to indicate a position of a future time window, and each code point corresponds to a start position and a length of one time window.

Example 3

The time information for transmitting the assistance information may be obtained based on its association with or mapping to a QoS parameter of data to be transmitted by the first device, and the corresponding QoS parameter may be delay information, priority information, reliability information, a data rate, or the like of the to-be-transmitted data.

When the time information indicates a position in a future time window with a length of L and is mutually associated with or mapped to a delay of the to-be-transmitted data in the QoS parameters, for example, assuming that a start point of the time window for transmitting the assistance information is t, and that the length is L, and that the delay of the to-be-transmitted data is T1, 1. t is equal to T1;
2. t is equal to n*T1, where n is a number between 0 and 1;
3. t is equal to T1−T2, where T2<T1, and T2 is predefined by a protocol or configured by a higher layer;
4. t is equal to 0, that is, it indicates the future time window with the length of L, starting from the current time; and
5. there is a correspondence between the time window for transmitting the assistance information and a delay value of the data to be transmitted by the sender of the trigger information for triggering transmission of the assistance information, where the correspondence may be a one-to-one correspondence, one t and one L correspond to one T1, and the correspondence may be predefined by a protocol, or may be configured by a higher layer (configured by RRC), or may be dynamically configured (configured by using SCI, DCI, or a media access control control element (MAC CE)).

When the time information is mutually associated with or mapped to a priority, reliability, and a data rate of the to-be-transmitted data in the QoS parameters, there is a one-to-one correspondence between the time window for transmitting the assistance information and the priority, reliability, and data rate of the to-be-transmitted data. For example, assuming that the start point of the time window for transmitting the assistance information is t, and that the time window length is L, and that the priority, reliability, and data rate of the data to be transmitted by the sender of the trigger information for triggering transmission of the assistance information are P, C, and V respectively, one t and one L may correspond to one P, one t and one L may correspond to one C, and one t and one L may correspond to one V. The correspondence may be predefined by a protocol, or configured by a higher layer (configured by RRC), or may be dynamically configured (configured by using SCI, DCI, or a MAC CE).

The QoS parameters are not limited to the foregoing. In addition, the transmission delay of the assistance information may also be associated with or mapped to a plurality of QoS parameters. For example, using the priority and reliability in the QoS parameters as an example, one priority and one reliability level may correspond to one transmission delay of the assistance information. The correspondence may be predefined by a protocol, or may be configured by a higher layer (configured by RRC), or may be dynamically configured (configured by using SCI, DCI, or a MAC CE).

In another optional embodiment, in a case that the first device uses the first-stage sidelink control information and/or the second-stage sidelink control information to carry the information about the to-be-transmitted service in the first information, in the first-stage sidelink control information and/or second-stage sidelink control information, the information about the to-be-transmitted service is indicated by a tenth indication field, where the tenth indication field is an independent indication field, or the tenth indication field is a jointly coded indication field, where each code point in the tenth indication field corresponds to at least one of the following:

a data volume of the to-be-transmitted service;
a delay requirement of the to-be-transmitted service;
a priority of the to-be-transmitted service;
a reliability requirement of the to-be-transmitted service;
a transmission rate requirement of the to-be-transmitted service;
a period of the to-be-transmitted service; and
a communication range requirement of the to-be-transmitted service.

For example, in the SCI/DCI, the information is indicated by an independent indication field, or indicated by joint coding with another indication field, or indicated by a code point reserved in an existing indication field, or indicated by an existing reserved indication field. Each code point corresponds to one data volume, and a unit thereof may be bit or delay length, or ms/slot/symbol/frame/subframe/priority/transmission rate/reliability level/period duration, or may be ms/slot/symbol/frame/subframe/distance value. The data volume corresponding to each code point may be predefined by a protocol or configured by a network, or configured through negotiation between devices.

Example 4

The data volume of the to-be-transmitted service, the delay information of the to-be-transmitted service, the priority of the to-be-transmitted service, the data rate of the to-be-transmitted service, the reliability of the to-be-transmitted service, the service period of the to-be-transmitted service, and the range value of the to-be-transmitted service may all be indicated by independent indication fields or indicated by joint coding. For the volume of the to-be-transmitted data (TB_size):

When the data volume of the to-be-transmitted service is indicated by an independent indication field, if a length of the independent indication field is two bits, it corresponds to four code points, and the four code points may correspond to four different TB_sizes to be transmitted. For example, when TB_sizes corresponding to code points 00, 01, 10, and 11 are 100 bits, 200 bits, 400 bits, and 800 bits, and the code point indicated in the indication field is 11, it indicates that the TB_size to be transmitted is 800 bits.

When indicated by joint coding indication field, the data volume to be transmitted is indicated by joint coding with another indication field, for example, indicated by joint coding with the priority indication field in the first-stage SCI. There are three bits in the existing priority indication field, corresponding to eight code points. Without increasing the number of bits, the eight code points correspond to eight priorities respectively and also correspond to eight TB_sizes to be transmitted. For example, a code point 000 may correspond to a priority 1 and indicate that the TB_size to be transmitted is 100 bits; and a code point 111 may correspond to a priority 8 and indicate that the TB_size to be transmitted is 800 bits. If the number of bits is increased, for example, increased to four bits in the priority indication field and corresponding to 16 code points, but it still only supports the indication of eight priorities, each priority indication may correspond to two code points. For example, the priority 8 corresponds to code points 1110 and 1111, where 1110 corresponds to the priority 8 and the 1500-bit TB_size to be transmitted, and 1111 corresponds to the priority 8 and indicates that the 1600-bit TB_size to be transmitted. In addition, the indication fields that can be jointly coded further include the frequency domain resource allocation indication field, the time domain resource allocation indication field, the resource reservation period indication field, the DMRS pattern indication field, the 2nd stage SCI format indication field, the beta offset indication field, the DMRS port quantity indication field, and the modulation and coding scheme indication field; and the HARQ process ID indication field, the NDI indication field, the RV indication field, the source ID indication field, the destination ID indication field, the CSI requirement indication field, the communication range indication field, the zone ID indication field, and the like in the 2nd stage SCI.

In summary, in this embodiment of this application, the first device sends the first information to the at least one second device, where the first information is used to trigger the second device to transmit the assistance information or the first information is used for performing resource selection or reservation by the second device, so that transmission reliability can be improved.

Figure 6:
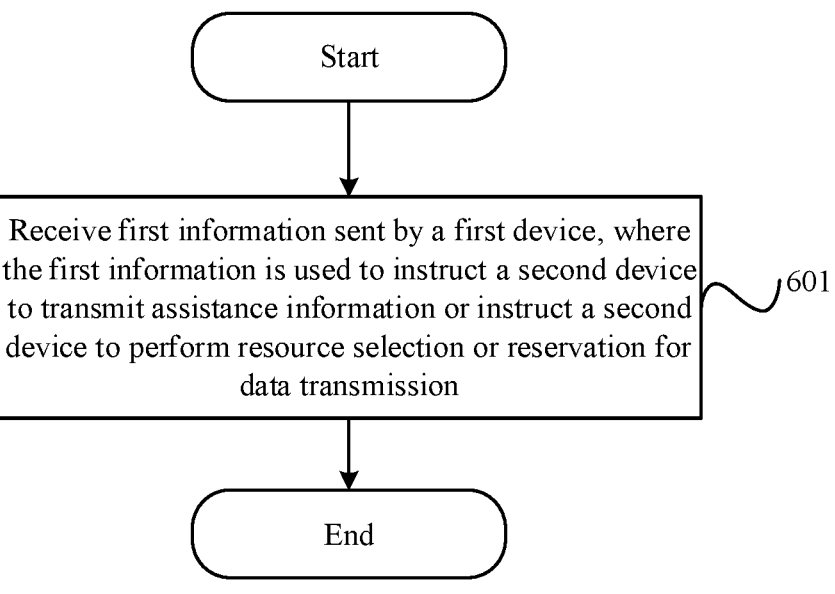
FIG. 6 is a second schematic diagram of steps of an information transmission method according to an embodiment of this application.

As shown in FIG. 6, an embodiment of this application further provides an information transmission method. The method is applied to a second device and includes:

Step 601: Receive first information sent by a first device, where the first information is used to trigger the second device to transmit assistance information or used for performing resource selection or reservation by the second device.

Specific application scenarios of this embodiment of this application include at least one of the following:

Scenario 1: As shown in FIG. 2, in a unicast scenario, a first device sends first information to a second device, and based on a resource indicated by the first information, the second device performs resource selection or resource reservation for data transmission.

Scenario 2: As shown in FIG. 3, in a groupcast scenario, a plurality of first devices in a group send first information to a second device in the group, and based on a resource indicated by the first information, the second device performs resource selection or resource reservation (for data transmission); or the second device transmits assistance information based on a resource indicated by the first information.

Scenario 3: As shown in FIG. 4, in a groupcast scenario, any device in a group sends first information to any other device in the group, and based on a resource indicated by the first information, the device receiving the first information performs resource selection or resource reservation (for data transmission); or the device receiving the first information transmits assistance information based on a resource indicated by the first information.

Scenario 4: As shown in FIG. 5, in a scenario in which a control node or a control terminal or a roadside unit exists, the control node or the control terminal or the roadside unit sends first information to a second device, and based on a resource indicated by the first information, the device receiving the first information performs resource selection or resource reservation (for data transmission); or the device receiving the first information transmits assistance information based on a resource indicated by the first information.

Scenario 5: In a broadcast scenario, a first device (any terminal) may send first information to a second device (any other terminal), and based on a resource indicated by the first information, the device receiving the first information performs resource selection or resource reservation (for data transmission); or the device receiving the first information transmits assistance information based on a resource indicated by the first information.

In an optional embodiment, the first information includes at least one of the following information:

first information type indication information, used to indicate whether the first information is trigger information for triggering transmission of the assistance information;

time domain resource indication information;

frequency domain resource indication information;

time information for transmitting the assistance information, where the time information may indicate a time window, and the second device may send the assistance information in the time window;

identification information of a first information sender, used to distinguish the first information sender;

identification information of a first information receiver, which is used to distinguish the first information receiver and may be a group ID, a terminal ID, a member ID in a group, or a specific fixed ID; and information about a to-be-transmitted service of the first device.

Optionally, if the first information includes the identification information of the first information receiver, if the identification information of the first information receiver is a predefined ID or an ID configured by a higher layer, all terminals need to receive the first information; if the identification information of the first information receiver is a group ID, all members in a specific group need to receive the first information; if the identification information of the first information receiver is a user ID in a group, a specific member in a specific group needs to receive the first information; or if the identification information of the first information receiver is a terminal ID, a specific user needs to receive the first information.

It should be noted that, if the first information is the trigger information for triggering transmission of the assistance information, the time domain resource indication information and/or the frequency domain resource indication information included in the first information are/is time domain resource indication information and/or frequency domain resource indication information for transmitting the assistance information. If the first information is not the trigger information for triggering transmission of the assistance information, the time domain resource indication information and/or the frequency domain resource indication information included in the first information are/is information about a resource occupied or reserved by the first device.

Optionally, the information about the to-be-transmitted service of the first device includes at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement value corresponding to the to-be-transmitted service.

Optionally, in this embodiment of this application, the first information type indication information is used to indicate at least one of the following:

the first information is not trigger information for triggering transmission of the assistance information; and the first information is trigger information for triggering transmission of the assistance information.

Optionally, in this embodiment of this application, the first information is carried in target information, and the target information includes at least one of the following:

sidelink control information;

downlink control information;

radio resource control information;

direct link radio resource control information; and sidelink feedback control information, where the sidelink control information further includes first-stage sidelink control information and second-stage sidelink control information.

In an optional embodiment, in a case that the first device uses the first-stage sidelink control information and/or the second-stage sidelink control information to carry the first information, in the first-stage sidelink control information and/or the second-stage sidelink control information, the type indication information is indicated by a first indication field, where each code point in the first indication field corresponds to one type of the first information;

or in the first-stage sidelink control information and/or the second-stage sidelink control information, the type indication information is indicated by joint coding with a second indication field, where each code point in the second indication field corresponds to one type of the first information;

or in the first-stage sidelink control information and/or the second-stage sidelink control information, the type indication information is indicated by a code point in a third indication field, where each code point in the third indication field corresponds to one type of the first information;

or in the second-stage sidelink control information, the type indication information is implicitly indicated by a code point in an information destination ID indication field;

or in the second-stage sidelink control information, the type indication information is implicitly indicated by a communication range requirement indication field and a geographical area ID indication field.

In an optional embodiment, the second indication field and/or the third indication field include/includes at least one of the following:

a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS port quantity indication field, a modulation and coding scheme indication field, a hybrid automatic repeat request HARQ process ID indication field, a new data indicator NDI indication field, a redundancy version RV indication field, an information source ID indication field, an information destination ID indication field, a channel state information CSI requirement indication field, a communication range requirement indication field, and a geographical area identification ID indication field.

In an optional embodiment, in a case that the target information is at least one of the first-stage sidelink control information, the second-stage sidelink control information, and the downlink control information, the method further includes:

determining, based on a format of the target information, whether the first information is trigger information for triggering transmission of the assistance information;

or determining, based on a radio network temporary identifier RNTI for scrambling the target information, whether the first information is trigger information for triggering transmission of the assistance information.

In an optional embodiment, in a case that the target information is the second-stage sidelink control information, the first information is carried in the second-stage sidelink control information in a specific format; and the format of the second-stage sidelink control information is indicated by using a fourth indication field in the first-stage sidelink control information, where the fourth indication field includes at least one of the following:

a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS configuration type indication field, and a modulation and coding scheme indication field.

In an optional embodiment, if the first information is the trigger information for triggering transmission of the assistance information, a method for generating the RNTI for scrambling the target information includes at least one of the following:

being generated by using a fixed value;

being equal to a predefined scrambling RNTI;

being equal to a scrambling RNTI configured by a higher layer;

being generated by using a resource pool ID;

being generated by using an information source ID;

being generated by using an information destination ID; and being generated by using a group ID.

In an optional embodiment, the method further includes:

determining, based on a transmission resource of the first information, whether the first information is trigger information for triggering transmission of the assistance information.

In an optional embodiment, if the first information is the trigger information for triggering transmission of the assistance information, the transmission resource of the first information includes at least one of the following:

a physical sidelink feedback channel;

a physical sidelink data channel;

a resource in a dedicated resource pool;

a preconfigured transmission resource;

a resource in a specific subband in a resource pool; and a resource on a specific symbol or in a specific subframe in a resource pool.

In an optional embodiment, in a case that the first device uses the first-stage sidelink control information and/or the second-stage sidelink control information to carry the time domain resource indication information for transmitting the assistance information, in the first information, the method further includes:

determining the time domain resource indication information based on a fifth indication field in the first-stage sidelink control information and/or the second-stage sidelink control information, where each code point in the fifth indication field corresponds to at least one piece of time domain resource indication information, and the time domain resource indication information includes at least one of a time domain resource start position, a time domain resource end position, and a time domain resource length, where the fifth indication field is an independent indication field, or the fifth indication field is a jointly coded indication field.

In an optional embodiment, in a case that the first device uses the first-stage sidelink control information and/or the second-stage sidelink control information to carry the frequency domain resource indication information for transmitting the assistance information, in the first information, the method further includes:

determining the frequency domain resource indication information based on a sixth indication field in the first-stage sidelink control information and/or the second-stage sidelink control information, where each code point in the sixth indication field corresponds to at least one piece of frequency domain resource indication information, and the frequency domain resource indication information includes at least one of a frequency domain resource start position, a frequency domain resource end position, and a frequency domain resource length, where the sixth indication field is an independent indication field, or the sixth indication field is a jointly coded indication field.

In an optional embodiment, in the first information, the time information for transmitting the assistance information includes at least one of the following:

time window position information for transmitting the assistance information;

time window length information for transmitting the assistance information; and delay information for transmitting the assistance information.

In an optional embodiment, in a case that the first device uses the first-stage sidelink control information and/or the second-stage sidelink control information to carry the time information for transmitting the assistance information, in the first information, the method further includes:

determining the time window position information and/or the time window length information based on a seventh indication field in the first-stage sidelink control information and/or the second-stage sidelink control information, where each code point in the seventh indication field corresponds to at least one piece of time window position information and/or time window length information, and the time window position information includes a time window start position and/or a time window end position, where the seventh indication field is an independent indication field, or the seventh indication field is a jointly coded indication field.

In an optional embodiment, in a case that the first device uses the first-stage sidelink control information and/or the second-stage sidelink control information to carry the time window length information for transmitting the assistance information, in the first information, the method further includes:

determining the time window length information based on an eighth indication field in the first-stage sidelink control information and/or the second-stage sidelink control information, where each code point in the eighth indication field corresponds to one time window length, where the eighth indication field is an independent indication field, or the eighth indication field is a jointly coded indication field.

In an optional embodiment, in a case that the first device uses the first-stage sidelink control information and/or the second-stage sidelink control information to carry the delay information for transmitting the assistance information, in the first information, the method further includes:

determining, based on a ninth indication field in the first-stage sidelink control information and/or the second-stage sidelink control information, the delay information for transmitting the assistance information, in the first information, where each code point in the ninth indication field corresponds to one delay value for transmitting the assistance information, where the ninth indication field is an independent indication field, or the ninth indication field is a jointly coded indication field.

In an optional embodiment, in a case that the first device uses the first-stage sidelink control information and/or the second-stage sidelink control information to carry the information about the to-be-transmitted service in the first information, the method further includes:

determining the information about the to-be-transmitted service based on a tenth indication field in the first-stage sidelink control information and/or the second-stage sidelink control information, where the tenth indication field is an independent indication field, or the tenth indication field is a jointly coded indication field, where each code point in the tenth indication field corresponds to at least one of the following:

a data volume of the to-be-transmitted service;

a delay requirement of the to-be-transmitted service;

a priority of the to-be-transmitted service;

a reliability requirement of the to-be-transmitted service;

a transmission rate requirement of the to-be-transmitted service;

a period of the to-be-transmitted service; and a communication range requirement of the to-be-transmitted service.

In another optional embodiment of this application, the method further includes:

determining a type of the first information, where a method for determining the type of the first information includes at least one of the following:

determining, based on content indicated by first information type indication information in the first information, whether the first information is trigger information for triggering transmission of the assistance information;

determining, based on a format of the first information and/or a format length of the first information, whether the first information is trigger information for triggering transmission of the assistance information;

determining, based on a RNTI for scrambling the first information, whether the first information is trigger information for triggering transmission of the assistance information; and a. determining, based on a transmission resource of the first information, whether the first information is trigger information for triggering transmission of the assistance information.

In another optional embodiment of this application, the method further includes:

if the first information is trigger information for triggering transmission of the assistance information, transmitting the assistance information based on a resource indicated by the first information;

or if the first information is trigger information for triggering transmission of the assistance information, and identification information of a first information receiver included in the first information matches the second device, transmitting the assistance information based on a resource indicated by the first information;

or if the first information is trigger information for triggering transmission of the assistance information, and a distance between a first information receiver and a first information sender meets a preset condition, transmitting the assistance information based on a resource indicated by the first information;

or if the first information is trigger information for triggering transmission of the assistance information, and an identity of a first information receiver included in the first information matches the second device, and a distance between the first information receiver and a first information sender meets a preset condition, transmitting the assistance information based on a resource indicated by the first information.

Alternatively, in another optional embodiment of this application, the method further includes:

if the first information is not trigger information for triggering transmission of the assistance information, performing resource selection or reservation for data transmission based on a resource indicated by the first information;

or if the first information is trigger information for triggering transmission of the assistance information, and identification information of a first information receiver included in the first information does not match the second device, performing resource selection or reservation for data transmission based on a resource indicated by the first information;

or if the first information is trigger information for triggering transmission of the assistance information, and a distance between a first information receiver and a first information sender does not meet a preset condition, performing resource selection or reservation for data transmission based on a resource indicated by the first information;

or if the first information is trigger information for triggering transmission of the assistance information, and an identity of a first information receiver included in the first information matches the second device, and a distance between the first information receiver and a first information sender does not meet a preset condition, performing resource selection or reservation for data transmission based on a resource indicated by the first information.

In another optional embodiment of this application, the transmitting the assistance information based on a resource indicated by the first information includes:

transmitting the assistance information on a resource indicated by time domain resource indication information and/or frequency domain resource indication information included in the first information.

In another optional embodiment of this application, the transmitting the assistance information based on a resource indicated by the first information includes:

selecting, based on time information included in the first information and used for transmitting the assistance information, a transmission resource for the assistance information in a time window indicated by the time information, and transmitting the assistance information.

In another optional embodiment of this application, the performing resource selection or reservation for data transmission based on a resource indicated by the first information includes:

when performing resource selection or reservation, excluding, based on time domain resource indication information and/or frequency domain resource indication information included in the first information, a time domain resource indicated by the time domain resource indication information and/or a resource indicated by the frequency domain resource indication information.

In another optional embodiment of this application, a manner of determining the preset condition includes at least one of the following:

determining based on indication information in a communication range requirement indication field in the first information;

determining based on a predefinition; and determining based on a higher-layer configuration.

In another optional embodiment of this application, if the assistance information transmitted by the second device carries an identity of an assistance information receiver, the identity of the assistance information receiver is the same as an identity of the first information sender in the first information.

In another optional embodiment of this application, if the first information is trigger information for triggering transmission of the assistance information, and the first information carries resource information of a to-be-transmitted service of the first device, the method further includes:

selecting a resource for the to-be-transmitted service of the first device based on information about the to-be-transmitted service of the first device, and indicating, by using the assistance information, a resource used for data transmission in the first device.

Example 5

In this embodiment of this application, minor modifications are made on a basis of original resource allocation, minor modifications are made to a signaling layer, and there is good compatibility.

The first information type indication information is introduced and used to distinguish whether the first information is the trigger information for triggering transmission of the assistance information.

If the first information type indication information indicates that the information is not the trigger information for triggering transmission of the assistance information, the information receiver needs to calculate resource positions through decoding based on indication information of time-frequency domain resource positions in the information when reserving resources, and exclude these resources; or if the information is the trigger information for triggering transmission of the assistance information, and the receiver ID carried in the information matches the ID of the information receiver, the information receiver needs to calculate resource positions through decoding based on indication information of time-frequency domain resource positions in the information when reserving resources, and transmit the assistance information on the resource positions obtained through decoding. Therefore, regardless of whether the information is the trigger information for triggering transmission of the assistance information, the information is not wasted or inconsistent understanding between the receiver and the sender is not caused. Therefore, introduction of the indication field may be well compatible with an existing resource allocation mechanism.

The information about the to-be-transmitted service included in the trigger information for triggering transmission of the assistance information is suitable for the receiver of the trigger information for triggering transmission of the assistance information to perform resource selection, including how many resources need to be selected and in which time period the resources are selected. The receiver can select best and optimal resources based on the indication information, to improve utilization of system resources.

Example 6

In a case that the information received by the second device includes both a first identifier indicating whether the information is the assistance information and a second identifier indicating whether the information is the trigger information for triggering transmission of the assistance information, different behaviors of the second device are as follows:

When the information received by the second device includes both the first identifier and the second identifier, and the identifiers are indicated in different indication fields, when a first identifier indication field indicates that the information is not the trigger information for triggering transmission of the assistance information, but a second identifier indication field indicates that the information is the assistance information, the information may be referred to as the assistance information; and if the receiver ID carried in the information matches the ID of the information receiver, the information receiver needs to calculate resource positions through decoding based on resource indication related information in the information when reserving resources, and list them as candidate resources or directly reserve these resources for data transmission.

Alternatively, when the information received by the second device includes both the first identifier and the second identifier, and the identifiers are indicated in different indication fields, when a first identifier indication field indicates that the information is not the trigger information for triggering transmission of the assistance information, but a second identifier indication field indicates that the information is the assistance information, the information may be referred to as the assistance information; and if the receiver ID carried in the information does not match the ID of the information receiver, the information receiver needs to calculate resource positions through decoding based on resource indication related information in the information when selecting or reserving resources, and exclude the resources.

Alternatively, when the information received by the second device includes both the first identifier and the second identifier, and the identifiers are indicated in different indication fields, when a first identifier indication field indicates that the information is the trigger information for triggering transmission of the assistance information, but a second identifier indication field indicates that the information is not the assistance information, the information may be referred to as the trigger information for triggering transmission of the assistance information; and if the receiver ID carried in the information matches the ID of the information receiver, the information receiver needs to calculate resource positions through decoding based on resource indication related information in the information when reserving resources, and list them as candidate resources or directly reserve these resources for transmitting the assistance information.

Alternatively, when the information received by the second device includes both the first identifier and the second identifier, and the identifiers are indicated in different indication fields, when a first identifier indication field indicates that the information is the trigger information for triggering transmission of the assistance information, but a second identifier indication field indicates that the information is not the assistance information, the information may be referred to as the trigger information for triggering transmission of the assistance information; and if the receiver ID carried in the information does not match the ID of the information receiver, the information receiver needs to calculate resource positions through decoding based on resource indication related information in the information when selecting or reserving resources, and exclude the resources.

Alternatively, when the information received by the second device includes both the first identifier and the second identifier, and the identifiers are indicated in different indication fields, when a first identifier indication field indicates that the information is not the trigger information for triggering transmission of the assistance information, but a second identifier indication field indicates that the information is not the assistance information, the information receiver needs to calculate resource positions through decoding based on resource indication related information in the information when selecting or reserving resources, and exclude the resources.

Alternatively, when the information received by the second device includes both the first identifier and the second identifier, and the identifiers are indicated in a same indication field, when the indication field indicates that the information is the assistance information, the information may be referred to as the assistance information; and if the receiver ID carried in the information matches the ID of the information receiver, the information receiver needs to calculate resource positions through decoding based on resource indication related information in the information when reserving resources, and list them as candidate resources or directly reserve these resources for data transmission.

Alternatively, when the information received by the second device includes both the first identifier and the second identifier, and the identifiers are indicated in a same indication field, when the indication field indicates that the information is the assistance information, the information may be referred to as the assistance information; and if the receiver ID carried in the information does not match the ID of the information receiver, the information receiver needs to calculate resource positions through decoding based on resource indication related information in the information when selecting or reserving resources, and exclude the resources.

Alternatively, when the information received by the second device includes both the first identifier and the second identifier, and the identifiers are indicated in a same indication field, when the indication field indicates that the information is the trigger information for triggering transmission of the assistance information, the information may be referred to as the trigger information for triggering transmission of the assistance information; and if the receiver ID carried in the information matches the ID of the information receiver, the information receiver needs to calculate resource positions through decoding based on resource indication related information in the information when reserving resources, and list them as candidate resources or directly reserve these resources for transmitting the assistance information.

Alternatively, when the information received by the second device includes both the first identifier and the second identifier, and the identifiers are indicated in a same indication field, when the indication field indicates that the information is the trigger information for triggering transmission of the assistance information, the information may be referred to as the trigger information for triggering transmission of the assistance information; and if the receiver ID carried in the information does not match the ID of the information receiver, the information receiver needs to calculate resource positions through decoding based on resource indication related information in the information when selecting or reserving resources, and exclude the resources.

Alternatively, when the information received by the second device includes both the first identifier and the second identifier, and the identifiers are indicated in a same indication field, when the indication field indicates that the information is neither the assistance information nor the trigger information for triggering transmission of the assistance information, the information receiver needs to calculate resource positions through decoding based on resource indication related information in the information when selecting or reserving resources, and exclude the resources.

Example 7

In a case that the information received by the second device includes both a first identifier indicating whether the information is the assistance information and a second identifier indicating whether the information is the trigger information for triggering transmission of the assistance information, the first identifier and the second identifier are indicated by a same indication field in the first-stage SCI, where a length of the indication field may be two bits, and corresponding code points are 00, 01, 10, and 11; and from the code points, a code point (such as 01) is selected to indicate that the information is the trigger information for triggering transmission of the assistance information, a code point (such as 10) is selected to indicate that the information is the assistance information, and a code point (such as 00) is selected to indicate that the information carries neither the assistance information nor the trigger information for triggering transmission of the assistance information.

Alternatively, the first identifier and the second identifier are indicated by a same indication field in the second-stage SCI, where a length of the indication field may be two bits, and corresponding code points are 00, 01, 10, and 11; and from the code points, a code point (such as 01) is selected to indicate that the information is the trigger information for triggering transmission of the assistance information, a code point (such as 10) is selected to indicate that the information is the assistance information, and a code point (such as 00) is selected to indicate that the information carries neither the assistance information nor the trigger information for triggering transmission of the assistance information.

In summary, in this embodiment of this application, the first device sends the first information to the at least one second device, where the first information is used to instruct the second device to transmit the assistance information or instruct the second device to perform resource selection or reservation for data transmission. Minor modifications are made to an original resource allocation scheme and the signaling layer, and there is good compatibility. Therefore, demodulation complexity of the second device can be reduced, and system overheads can be reduced.

Figure 7:
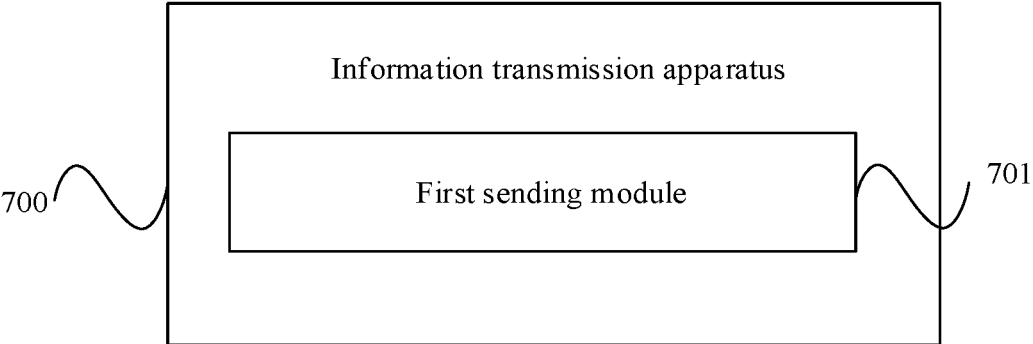
FIG. 7 is a first schematic structural diagram of an information transmission apparatus according to an embodiment of this application.

As shown in FIG. 7, an embodiment of this application further provides an information transmission apparatus 700. The apparatus is applied to a first device and includes:

a first sending module 701, configured to send first information to at least one second device, where the first information is used to trigger the second device to transmit assistance information or used for performing resource selection or reservation by the second device.

Optionally, in the foregoing embodiment of this application, the first information includes at least one of the following information:

first information type indication information;
time domain resource indication information;
frequency domain resource indication information;
time information for transmitting the assistance information;
identification information of a first information sender;
identification information of a first information receiver; and
information about a to-be-transmitted service of the first device.

Optionally, in the foregoing embodiment of this application, the information about the to-be-transmitted service of the first device includes at least one of the following:

a data volume of the to-be-transmitted service;
delay information of the to-be-transmitted service;
a priority of the to-be-transmitted service;
a data rate of the to-be-transmitted service;
reliability of the to-be-transmitted service;
a service period of the to-be-transmitted service; and
a communication range requirement corresponding to the to-be-transmitted service.

Optionally, in the foregoing embodiment of this application, the first information is carried in target information, and the target information includes at least one of the following:

sidelink control information;
downlink control information;
radio resource control information;
direct link radio resource control information; and
sidelink feedback control information, where
the sidelink control information further includes first-stage sidelink control information and second-stage sidelink control information.

Optionally, in the foregoing embodiment of this application, the first information type indication information is used to indicate at least one of the following:

the first information is not trigger information for triggering transmission of the assistance information; and the first information is trigger information for triggering transmission of the assistance information.

Optionally, in the foregoing embodiment of this application, in a case that the first device uses the first-stage sidelink control information and/or the second-stage sidelink control information to carry the first information, in the first-stage sidelink control information and/or the second-stage sidelink control information, the type indication information is indicated by a first indication field, where each code point in the first indication field corresponds to one type of the first information;

or in the first-stage sidelink control information and/or the second-stage sidelink control information, the type indication information is indicated by joint coding with a second indication field, where each code point in the second indication field corresponds to one type of the first information;

or in the first-stage sidelink control information and/or the second-stage sidelink control information, the type indication information is indicated by a code point in a third indication field, where each code point in the third indication field corresponds to one type of the first information;

or in the second-stage sidelink control information, the type indication information is implicitly indicated by a code point in an information destination ID indication field;

or in the second-stage sidelink control information, the type indication information is implicitly indicated by a communication range requirement indication field and a geographical area ID indication field.

Optionally, in the foregoing embodiment of this application, the second indication field and/or the third indication field include/includes at least one of the following: a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS port quantity indication field, a modulation and coding scheme indication field, a hybrid automatic repeat request HARQ process ID indication field, a new data indicator NDI indication field, a redundancy version RV indication field, an information source ID indication field, an information destination ID indication field, a channel state information CSI requirement indication field, a communication range requirement indication field, and a geographical area identification ID indication field.

Optionally, in the foregoing embodiment of this application, in a case that the target information is at least one of the first-stage sidelink control information, the second-stage sidelink control information, and the downlink control information, the apparatus further includes:

a first indication module, configured to: indicate, by using a format of the target information, whether the first information is trigger information for triggering transmission of the assistance information; or indicate, by using a radio network temporary identifier RNTI for scrambling the target information, whether the first information is trigger information for triggering transmission of the assistance information.

Optionally, in the foregoing embodiment of this application, in a case that the target information is the second-stage sidelink control information, the first information is carried in the second-stage sidelink control information in a specific format, and the apparatus further includes:

a second indication module, configured to indicate the format of the second-stage sidelink control information by using a fourth indication field in the first-stage sidelink control information, where the fourth indication field includes at least one of the following:

a priority indication field, a resource reservation period indication field, a frequency domain resource allocation indication field, a time domain resource allocation indication field, a demodulation reference signal DMRS pattern indication field, a second-stage SCI format indication field, a β offset indication field, a DMRS configuration type indication field, and a modulation and coding scheme indication field.

Optionally, in the foregoing embodiment of this application, if the first information is the trigger information for triggering transmission of the assistance information, a method for generating the RNTI for scrambling the target information includes at least one of the following:

being generated by using a predefined value;

being equal to a predefined scrambling RNTI;

being equal to a scrambling RNTI configured by a higher layer;

being generated by using a resource pool ID;

being generated by using an information source ID;

being generated by using an information destination ID; and being generated by using a group ID.

Optionally, in the foregoing embodiment of this application, the apparatus further includes:

a third indication module, configured to indicate, by using a transmission resource of the first information, whether the first information is trigger information for triggering transmission of the assistance information.

Optionally, in the foregoing embodiment of this application, if the first information is the trigger information for triggering transmission of the assistance information, the transmission resource of the first information includes at least one of the following:

a physical sidelink feedback channel;

a physical sidelink data channel;

a resource in a dedicated resource pool;

a preconfigured transmission resource;

a resource in a specific subband in a resource pool; and a resource on a specific symbol or in a specific subframe in a resource pool.

Optionally, in the foregoing embodiment of this application, in a case that the first device uses the first-stage sidelink control information and/or the second-stage sidelink control information to carry the time domain resource indication information in the first information, in the first-stage sidelink control information and/or the second-stage sidelink control information, the time domain resource indication information is indicated by a fifth indication field, where each code point in the fifth indication field corresponds to at least one piece of time domain resource indication information, and the time domain resource indication information includes at least one of a time domain resource start position, a time domain resource end position, and a time domain resource length, where the fifth indication field is an independent indication field, or the fifth indication field is a jointly coded indication field.

Optionally, in the foregoing embodiment of this application, in a case that the first device uses the first-stage sidelink control information and/or the second-stage sidelink control information to carry the frequency domain resource indication information in the first information, in the first-stage sidelink control information and/or the second-stage sidelink control information, the frequency domain resource indication information is indicated by a sixth indication field, where each code point in the sixth indication field corresponds to at least one piece of frequency domain resource indication information, and the frequency domain resource indication information includes at least one of a frequency domain resource start position, a frequency domain resource end position, and a frequency domain resource length, where the sixth indication field is an independent indication field, or the sixth indication field is a jointly coded indication field.

Optionally, in the foregoing embodiment of this application, in the first information, the time information for transmitting the assistance information includes at least one of the following:

time window position information for transmitting the assistance information;

time window length information for transmitting the assistance information; and delay information for transmitting the assistance information.

Optionally, in the foregoing embodiment of this application, the apparatus further includes:

an information determining module, configured to determine, based on a quality of service QoS parameter mapping of the to-be-transmitted service, or a predefinition, or a higher-layer configuration, the time information for transmitting the assistance information, where the QoS parameter of the to-be-transmitted service includes at least one of the following:

a delay requirement of the to-be-transmitted service;

a priority of the to-be-transmitted service;

a reliability requirement of the to-be-transmitted service;

a transmission rate requirement of the to-be-transmitted service;

a data volume of the to-be-transmitted service; and a communication range requirement of the to-be-transmitted service.

Optionally, in the foregoing embodiment of this application, in a case that the first device uses the first-stage sidelink control information and/or the second-stage sidelink control information to carry the time information for transmitting the assistance information, in the first information, in the first-stage sidelink control information and/or the second-stage sidelink control information, the time window position information and/or the time window length information are/is indicated by a seventh indication field, where each code point in the seventh indication field corresponds to at least one piece of time window position information and/or time window length information, and the time window position information includes a time window start position and/or a time window end position, where the seventh indication field is an independent indication field, or the seventh indication field is a jointly coded indication field.

Optionally, in the foregoing embodiment of this application, in a case that the first device uses the first-stage sidelink control information and/or the second-stage sidelink control information to carry the time window length information for transmitting the assistance information, in the first information, in the first-stage sidelink control information and/or the second-stage sidelink control information, the time window length information is indicated by an eighth indication field, where each code point in the eighth indication field corresponds to one time window length, where the eighth indication field is an independent indication field, or the eighth indication field is a jointly coded indication field.

Optionally, in the foregoing embodiment of this application, in a case that the first device uses the first-stage sidelink control information and/or the second-stage sidelink control information to carry the delay information for transmitting the assistance information, in the first information, in the first-stage sidelink control information and/or the second-stage sidelink control information, the delay information for transmitting the assistance information, in the first information is indicated by a ninth indication field, where each code point in the ninth indication field corresponds to one delay value for transmitting the assistance information, where the ninth indication field is an independent indication field, or the ninth indication field is a jointly coded indication field.

Optionally, in the foregoing embodiment of this application, in a case that the first device uses the first-stage sidelink control information and/or the second-stage sidelink control information to carry the information about the to-be-transmitted service in the first information, in the first-stage sidelink control information and/or the second-stage sidelink control information, the information about the to-be-transmitted service is indicated by a tenth indication field, where the tenth indication field is an independent indication field, or the tenth indication field is a jointly coded indication field, where each code point in the tenth indication field corresponds to at least one of the following:

a data volume of the to-be-transmitted service;

a delay requirement of the to-be-transmitted service;

a priority of the to-be-transmitted service;

a reliability requirement of the to-be-transmitted service;

a transmission rate requirement of the to-be-transmitted service;

a period of the to-be-transmitted service; and a communication range requirement of the to-be-transmitted service.

The information transmission apparatus provided in this embodiment of this application can implement each process implemented by the information transmission apparatus in the method embodiments in FIG. 1 to FIG. 5. To avoid repetition, details are not described herein again.

In this embodiment of this application, the first device sends the first information to the at least one second device, where the first information is used to instruct the second device to transmit the assistance information or instruct the second device to perform resource selection or reservation for data transmission. Minor modifications are made to an original resource allocation scheme and a signaling layer, and there is good compatibility. Therefore, demodulation complexity of the second device can be reduced, and system overheads can be reduced.

Figure 8:
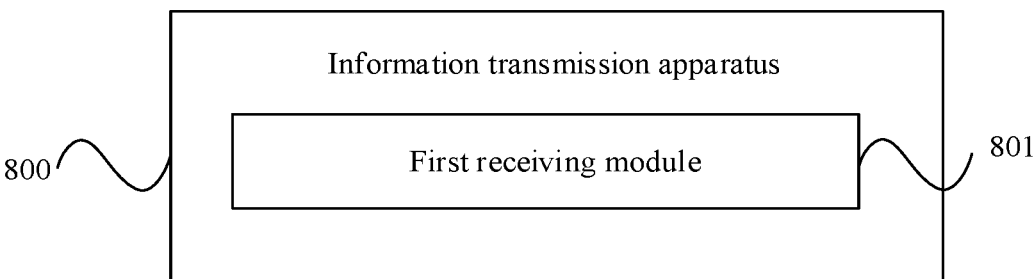
FIG. 8 is a second schematic structural diagram of an information transmission apparatus according to an embodiment of this application.

As shown in FIG. 8, an embodiment of this application further provides an information transmission apparatus 800. The apparatus is applied to a second device and includes:

a first receiving module 801, configured to receive first information sent by a first device, where the first information is used to trigger the second device to transmit assistance information or used for performing resource selection or reservation by the second device.

Optionally, in the foregoing embodiment of this application, the first information includes at least one of the following information:

first information type indication information;

time domain resource indication information;

frequency domain resource indication information;

time information for transmitting the assistance information;

identification information of a first information sender;

identification information of a first information receiver; and information about a to-be-transmitted service of the first device.

Optionally, in the foregoing embodiment of this application, the information about the to-be-transmitted service of the first device includes at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement corresponding to the to-be-transmitted service.

Optionally, in the foregoing embodiment of this application, the first information is carried in target information, and the target information includes at least one of the following:

sidelink control information;

downlink control information;

radio resource control information;

direct link radio resource control information; and sidelink feedback control information, where the sidelink control information further includes first-stage sidelink control information and second-stage sidelink control information.

Optionally, in the foregoing embodiment of this application, the first information type indication information is used to indicate at least one of the following:

the first information is not trigger information for triggering transmission of the assistance information; and the first information is trigger information for triggering transmission of the assistance information.

Optionally, in the foregoing embodiment of this application, the apparatus further includes:

a type determining module, configured to determine a type of the first information, where a method for determining the type of the first information includes at least one of the following:

determining, based on content indicated by first information type indication information in the first information, whether the first information is trigger information for triggering transmission of the assistance information;

determining, based on a format of the first information and/or a format length of the first information, whether the first information is trigger information for triggering transmission of the assistance information;

determining, based on a RNTI for scrambling the first information, whether the first information is trigger information for triggering transmission of the assistance information; and determining, based on a transmission resource of the first information, whether the first information is trigger information for triggering transmission of the assistance information.

Optionally, in the foregoing embodiment of this application, the apparatus further includes:

a first transmission module, configured to: if the first information is trigger information for triggering transmission of the assistance information, transmit the assistance information based on a resource indicated by the first information; or if the first information is trigger information for triggering transmission of the assistance information, and identification information of a first information receiver included in the first information matches the second device, transmit the assistance information based on a resource indicated by the first information; or if the first information is trigger information for triggering transmission of the assistance information, and a distance between a first information receiver and a first information sender meets a preset condition, transmit the assistance information based on a resource indicated by the first information; or if the first information is trigger information for triggering transmission of the assistance information, and an identity of a first information receiver included in the first information matches the second device, and a distance between the first information receiver and a first information sender meets a preset condition, transmit the assistance information based on a resource indicated by the first information.

Optionally, in the foregoing embodiment of this application, the apparatus further includes:

a resource processing module, configured to: if the first information is not trigger information for triggering transmission of the assistance information, perform resource selection or reservation for data transmission based on a resource indicated by the first information; or if the first information is trigger information for triggering transmission of the assistance information, and identification information of a first information receiver included in the first information does not match the second device, perform resource selection or reservation for data transmission based on a resource indicated by the first information; or if the first information is trigger information for triggering transmission of the assistance information, and a distance between a first information receiver and a first information sender does not meet a preset condition, perform resource selection or reservation for data transmission based on a resource indicated by the first information; or if the first information is trigger information for triggering transmission of the assistance information, and an identity of a first information receiver included in the first information matches the second device, and a distance between the first information receiver and a first information sender does not meet a preset condition, perform resource selection or reservation for data transmission based on a resource indicated by the first information.

Optionally, in the foregoing embodiment of this application, the first transmission module includes:

a first transmission submodule, configured to transmit the assistance information on a resource indicated by time domain resource indication information and/or frequency domain resource indication information included in the first information.

Optionally, in the foregoing embodiment of this application, the first transmission module includes:

a second transmission submodule, configured to select, based on time information included in the first information and used for transmitting the assistance information, a transmission resource for the assistance information in a time window indicated by the time information, and transmit the assistance information.

Optionally, in the foregoing embodiment of this application, the resource processing module includes:

a resource processing submodule, configured to: when performing resource selection or reservation, exclude, based on time domain resource indication information and/or frequency domain resource indication information included in the first information, a time domain resource indicated by the time domain resource indication information and/or a resource indicated by the frequency domain resource indication information.

Optionally, in the foregoing embodiment of this application, a manner of determining the preset condition includes at least one of the following:

determining based on indication information in a communication range requirement indication field in the first information;

determining based on a predefinition; and determining based on a higher-layer configuration.

Optionally, in the foregoing embodiment of this application, if the assistance information transmitted by the second device carries an identity of an assistance information receiver, the identity of the assistance information receiver is the same as an identity of the first information sender in the first information.

Optionally, in the foregoing embodiment of this application, if the first information is trigger information for triggering transmission of the assistance information, and the first information carries resource information of a to-be-transmitted service of the first device, the apparatus further includes:

a resource determining module, configured to select a resource for the to-be-transmitted service of the first device based on information about the to-be-transmitted service of the first device, and indicate, by using the assistance information, a resource used for data transmission in the first device.

The information transmission apparatus provided in this embodiment of this application can implement each process implemented by the information transmission apparatus in the method embodiments in FIG. 2 to FIG. 5, and to avoid repetition, details are not described herein again.

In this embodiment of this application, the first device sends the first information to the at least one second device, where the first information is used to instruct the second device to transmit the assistance information or instruct the second device to perform resource selection or reservation for data transmission. Minor modifications are made to an original resource allocation scheme and a signaling layer, and there is good compatibility. Therefore, demodulation complexity of the second device can be reduced, and system overheads can be reduced.

The information transmission apparatus in this embodiment of this application may be an apparatus, or may be a component, an integrated circuit, or a chip in a terminal. The apparatus may be a mobile electronic device, or may be a nonmobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The nonmobile electronic device may be a server, a network attached storage (NAS), a personal computer (PC), a television (TV), a teller machine, a self-service machine, or the like. This is not specifically limited in this embodiment of this application.

The information transmission apparatus in this embodiment of this application may be an apparatus having an operating system. The operating system may be an Android operating system, an iOS operating system, or other possible operating systems, and is not specifically limited in this embodiment of this application.

Optionally, an embodiment of this application further provides an electronic device, including a processor, a memory, and a program or instructions stored in the memory and capable of running on the processor. When the program or instructions are executed by the processor, each process of the foregoing embodiment of the information transmission method is implemented, with the same technical effect achieved. To avoid repetition, details are not described herein again.

It should be noted that electronic devices in this embodiment of this application include the foregoing mobile electronic device and a nonmobile electronic device.

Figure 9:
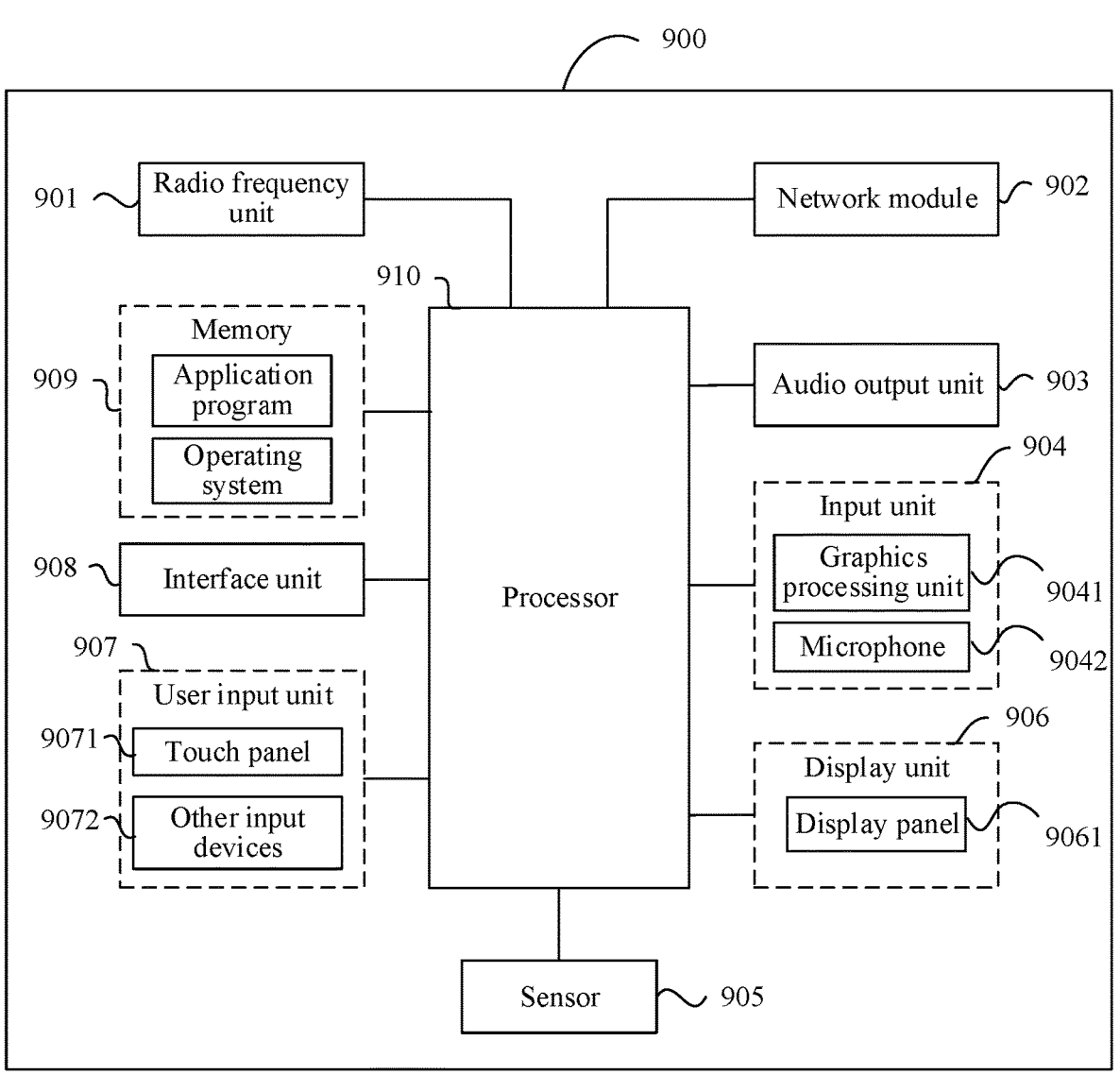
FIG. 9 is a schematic structural diagram of an electronic device according to an embodiment of this application.

FIG. 9 is a schematic diagram of a hardware structure of an electronic device (a first device and/or a second device) for implementing various embodiments of this application.

The electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the electronic device 900 may further include a power supply (such as a battery) for supplying power to the components. The power supply may be logically connected to the processor 910 through a power management system. In this way, functions such as charge management, discharge management, and power consumption management are implemented by using the power management system. The structure of the electronic device shown in FIG. 9 does not constitute a limitation on the electronic device. The electronic device may include more or fewer components than those shown in the figure, or some components are combined, or component arrangements are different. Details are not described herein again.

The radio frequency unit 901 is configured to send first information to at least one second device, where the first information is used to trigger the second device to transmit assistance information or used for performing resource selection or reservation by the second device; or the radio frequency unit 901 is configured to receive first information sent by a first device, where the first information is used to trigger the second device to transmit assistance information or used for performing resource selection or reservation by the second device.

In this embodiment of this application, the first device sends the first information to the at least one second device, where the first information is used to instruct the second device to transmit the assistance information or instruct the second device to perform resource selection or reservation for data transmission. Minor modifications are made to an original resource allocation scheme and a signaling layer, and there is good compatibility. Therefore, demodulation complexity of the second device can be reduced, and system overheads can be reduced.

It should be understood that in this embodiment of this application, the radio frequency unit 901 may be configured to receive and send information, or to receive and send a signal in a call process, and specifically, after receiving downlink data from a base station, send the downlink data to the processor 910 for processing; and also send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The electronic device provides a user with wireless broadband internet access through the network module 902, for example, helping the user transmit and receive e-mails, browse web pages, and access streaming media.

The audio output unit 903 may convert audio data received by the radio frequency unit 901 or the network module 902 or stored in the memory 909 into an audio signal and output the audio signal as a sound. In addition, the audio output unit 903 may further provide an audio output (for example, a call signal received sound or a message received sound) related to a specific function performed by the electronic device 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or be sent by the radio frequency unit 901 or the network module 902. The microphone 9042 is capable of receiving sounds and processing such sounds into audio data. The processed audio data can be converted in a telephone call mode into a format that can be sent to a mobile communications base station through the radio frequency unit 901, for outputting.

The electronic device 900 further includes at least one sensor 905, for example, an optical sensor, a motion sensor, and other sensors. Specifically, the optical sensor includes an ambient light sensor and a proximity sensor. The ambient light sensor may adjust luminance of the display panel 9061 based on brightness of ambient light, and the proximity sensor may turn off the display panel 9061 and/or backlight when the electronic device 900 moves close to an ear. As a type of motion sensor, an accelerometer sensor can detect magnitudes of accelerations in all directions (usually three axes), can detect a magnitude and a direction of gravity when the electronic device is in a stationary state, and can be applied to electronic device posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include a display panel 9061, and the display panel 9061 may be configured in a form of a liquid crystal display (LCD), an organic light-emitting diode (OLED), or the like.

The user input unit 907 may be configured to receive input digit or character information and generate a key signal input related to user setting and function control of the electronic device. Specifically, the user input unit 907 includes a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touch point coordinates, and sends the touch point coordinates to the processor 910, and receives a command sent by the processor 910 and executes the command. In addition, the touch panel 9071 may be implemented in a plurality of forms, for example, a resistive, capacitive, infrared, or surface acoustic wave touch panel. The user input unit 907 may further include the other input devices 9072 in addition to the touch panel 9071. Specifically, the other input devices 9072 may include but are not limited to a physical keyboard, a function key (such as a volume control key or a switch key), a trackball, a mouse, and a joystick. Details are not described herein again.

Further, the touch panel 9071 may cover the display panel 9061. When detecting a touch operation on or near the touch panel 9071, the touch panel 9071 transmits the touch operation to the processor 910 to determine a type of a touch event. Then the processor 910 provides a corresponding visual output on the display panel 9061 based on the type of the touch event. Although in FIG. 9, the touch panel 9071 and the display panel 9061 act as two independent parts to implement input and output functions of the electronic device, in some embodiments, the touch panel 9071 and the display panel 9061 may be integrated to implement the input and output functions of the electronic device. This is not specifically limited herein.

The interface unit 908 is an interface between an external apparatus and the electronic device 900. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 908 may be configured to receive an input (for example, data information or power) from an external apparatus and transmit the received input to one or more elements within the electronic device 900, or may be configured to transmit data between the electronic device 900 and the external apparatus.

The memory 909 may be configured to store software programs and various data. The memory 909 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 909 may include a high-speed random access memory, and may further include a non-volatile memory such as a disk storage device, a flash memory device, or another volatile solid-state storage device.

The processor 910 is a control center of the electronic device, uses various interfaces and lines to connect parts of the entire electronic device, and executes various functions and processing data of the electronic device by running or executing software programs and/or modules stored in the memory 909 and invoking data stored in the memory 909, so as to perform overall monitoring on the electronic device. The processor 910 may include one or more processing units. Preferably, the processor 910 may integrate an application processor and a modem processor. The application processor mainly processes the operating system, a user interface, an application program, and the like. The modem processor mainly processes wireless communication. It can be understood that the modem processor may alternatively be not integrated in the processor 910.

The electronic device 900 may further include the power supply (such as a battery) for supplying power to the components. Preferably, the power supply may be logically connected to the processor 910 through a power management system. In this way, functions such as charge management, discharge management, and power consumption management are implemented by using the power management system.

In addition, the electronic device 900 includes some functional modules that are not shown. Details are not described herein.

An embodiment of this application further provides a readable storage medium. The readable storage medium stores a program or instructions. When the program or instructions are executed by a processor, each process of the foregoing embodiment of the information transmission method is implemented, with the same technical effect achieved. To avoid repetition, details are not described herein again.

The processor is the processor in the electronic device described in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the embodiment of the information transmission method, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, applied to a first device, wherein the method comprises:

sending first information to at least one second device, wherein the first information is used to trigger the second device to transmit assistance information or used for performing resource selection or reservation by the second device;

wherein the first information comprises the following information:

first information type indication information;

wherein in a case that the first device uses a second-stage sidelink control information to carry the first information, in the second-stage sidelink control information, the type indication information is indicated by a first indication field, wherein each code point in the first indication field corresponds to one type of the first information;

wherein the first information type indication information is used to indicate at least one of the following:

the first information is not trigger information for triggering transmission of the assistance information; and the first information is trigger information for triggering transmission of the assistance information.

2. The method according to claim 1, wherein the first information further comprises at least one of the following information:

identification information of a first information sender;

identification information of a first information receiver;

information about a to-be-transmitted service of the first device;

time domain resource indication information;

frequency domain resource indication information; and time information for transmitting the assistance information.

3. The method according to claim 1, wherein the information about the to-be-transmitted service of the first device comprises at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement corresponding to the to-be-transmitted service.

4. A non-transitory readable storage medium, wherein the readable storage medium stores a program or instructions, and when the program or instructions are executed by a processor, the steps of the information transmission method according to claim 1 are implemented.

5. A chip, wherein the chip comprises a processor and a communications interface, the communications interface is coupled to the processor, and the processor is configured to run a program or instructions to implement the information transmission method according to claim 1.

6. An electronic device, configured to perform the information transmission method according to claim 1.

7. An information transmission method, applied to a second device, wherein the method comprises:

receiving first information sent by a first device, wherein the first information is used to trigger the second device to transmit assistance information or used for performing resource selection or reservation by the second device;

wherein the first information comprises the following information:

first information type indication information;

wherein in a case that the first device uses a second-stage sidelink control information to carry the first information, in the second-stage sidelink control information, the type indication information is indicated by a first indication field, wherein each code point in the first indication field corresponds to one type of the first information;

wherein the first information type indication information is used to indicate at least one of the following:

the first information is not trigger information for triggering transmission of the assistance information; and the first information is trigger information for triggering transmission of the assistance information.

8. The method according to claim 7, wherein the first information further comprises at least one of the following information:

identification information of a first information sender;

identification information of a first information receiver;

information about a to-be-transmitted service of the first device;

time domain resource indication information;

frequency domain resource indication information; and time information for transmitting the assistance information.

9. The method according to claim 7, wherein the information about the to-be-transmitted service of the first device comprises at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement corresponding to the to-be-transmitted service.

10. An electronic device, comprising a processor, a memory, and a program or instructions stored in the memory and capable of running on the processor, wherein when the program or instructions are executed by the processor, the steps of the information transmission method according to claim 7 are implemented.

11. An electronic device, comprising a processor, a memory, and a program or instructions stored in the memory and capable of running on the processor, wherein when the program or instructions are executed by the processor, the steps of an information transmission method are implemented, wherein the method comprises:

sending first information to at least one second device, wherein the first information is used to trigger the second device to transmit assistance information or used for performing resource selection or reservation by the second device;

wherein the first information comprises the following information:

first information type indication information;

wherein in a case that the first device uses a second-stage sidelink control information to carry the first information, in the second-stage sidelink control information, the type indication information is indicated by a first indication field, wherein each code point in the first indication field corresponds to one type of the first information;

wherein the first information type indication information is used to indicate at least one of the following:

the first information is not trigger information for triggering transmission of the assistance information; and the first information is trigger information for triggering transmission of the assistance information.

12. The electronic device according to claim 11, wherein the first information further comprises at least one of the following information:

identification information of a first information sender;

identification information of a first information receiver;

information about a to-be-transmitted service of the first device;

time domain resource indication information;

frequency domain resource indication information; and time information for transmitting the assistance information.

13. The electronic device according to claim 11, wherein the information about the to-be-transmitted service of the first device comprises at least one of the following:

a data volume of the to-be-transmitted service;

delay information of the to-be-transmitted service;

a priority of the to-be-transmitted service;

a data rate of the to-be-transmitted service;

reliability of the to-be-transmitted service;

a service period of the to-be-transmitted service; and a communication range requirement corresponding to the to-be-transmitted service.

* * * * *